(12) United States Patent
Mattioli et al.

(10) Patent No.: US 10,087,008 B2
(45) Date of Patent: Oct. 2, 2018

(54) FEEDING UNIT FOR FEEDING SEALED PACKS OF POURABLE FOOD PRODUCTS

(71) Applicant: TETRA LAVAL HOLDINGS & FINANCE S.A, Pully (CH)

(72) Inventors: Giorgio Mattioli, Modena (IT); Richard John Pedretti, Formigine (IT); Dino Neri, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/317,622

(22) PCT Filed: May 28, 2015

(86) PCT No.: PCT/EP2015/061784
§ 371 (c)(1),
(2) Date: Dec. 9, 2016

(87) PCT Pub. No.: WO2015/189038
PCT Pub. Date: Dec. 17, 2015

(65) Prior Publication Data
US 2017/0113877 A1    Apr. 27, 2017

(30) Foreign Application Priority Data

Jun. 10, 2014   (EP) .................................... 14171689

(51) Int. Cl.
*B65G 19/02*   (2006.01)
*B65G 15/44*   (2006.01)
(Continued)

(52) U.S. Cl.
CPC ................ *B65G 19/02* (2013.01); *B65B 9/20* (2013.01); *B65B 43/48* (2013.01); *B65B 43/52* (2013.01);
(Continued)

(58) Field of Classification Search
CPC .......... B65G 19/02; B65G 15/44; B65B 43/52
(Continued)

(56) References Cited

U.S. PATENT DOCUMENTS 4,019,624 A * 4/1977 Torres .................... B65G 23/38
198/459.8
4,372,440 A * 2/1983 Ringis ................... B65G 23/44
198/728
(Continued)

FOREIGN PATENT DOCUMENTS

EP    0 061 663 A2    10/1982
EP    1 145 960 A2    10/2001
(Continued)

OTHER PUBLICATIONS

International Search Report (PCT/ISA/210) dated Jul. 27, 2015, by the European Patent Office as the International Searching Authority for International Application No. PCT/EP2015/061784.
(Continued)

*Primary Examiner* — Douglas A Hess
(74) *Attorney, Agent, or Firm* — Buchanan Ingersoll & Rooney PC

(57) ABSTRACT

A feeding unit for feeding sealed packs of pourable food products to a folding unit arranged to form folded packages from said packs, said feeding unit comprising a feeding conveyor having a carrying arrangement movable cyclically along an advancing path to carry said packs towards said folding unit, wherein said feeding unit further comprises a push arrangement arranged to push said packs towards said advancing path.

15 Claims, 3 Drawing Sheets

(51) Int. Cl.
    *B65B 43/48*      (2006.01)
    *B65B 43/52*      (2006.01)
    *B65B 61/24*      (2006.01)
    *B65B 61/28*      (2006.01)
    *B65B 9/20*      (2012.01)
    *B65B 51/10*      (2006.01)
    *B65B 61/06*      (2006.01)
    *B65B 9/10*      (2006.01)

(52) U.S. Cl.
    CPC .............. *B65B 51/10* (2013.01); *B65B 61/06* (2013.01); *B65B 61/24* (2013.01); *B65B 61/28* (2013.01); *B65G 15/44* (2013.01); *B65B 9/10* (2013.01)

(58) Field of Classification Search
    USPC .................................. 198/717, 722, 727, 728
    See application file for complete search history.

(56) References Cited

U.S. PATENT DOCUMENTS

| | | | | |
|---|---|---|---|---|
| 4,561,546 A | * | 12/1985 | Maroney | B07C 5/10 198/728 |
| 4,682,684 A | * | 7/1987 | Lothman | B65G 47/31 198/459.8 |
| 5,785,804 A | * | 7/1998 | Kovacs | B65B 43/465 156/216 |
| 6,698,576 B2 | * | 3/2004 | Hahnel | B65G 17/26 198/469.1 |
| 7,581,637 B2 | * | 9/2009 | Lenherr | B65B 35/24 198/459.8 |
| 9,776,750 B2 | * | 10/2017 | May | B65G 17/025 |
| 2001/0030106 A1 | | 10/2001 | Yamamoto et al. | |
| 2013/0237396 A1 | | 9/2013 | Paradisi et al. | |
| 2014/0131173 A1 | | 5/2014 | Pedretti et al. | |

FOREIGN PATENT DOCUMENTS

| EP | 2 468 641 A1 | 6/2012 |
|---|---|---|
| EP | 2 586 715 A1 | 5/2013 |
| WO | WO 2010/084660 A1 | 7/2010 |

OTHER PUBLICATIONS

Written Opinion (PCT/ISA/237) dated Jul. 27, 2015, by the European Patent Office as the International Searching Authority for International Application No. PCT/EP2015/061784.

* cited by examiner

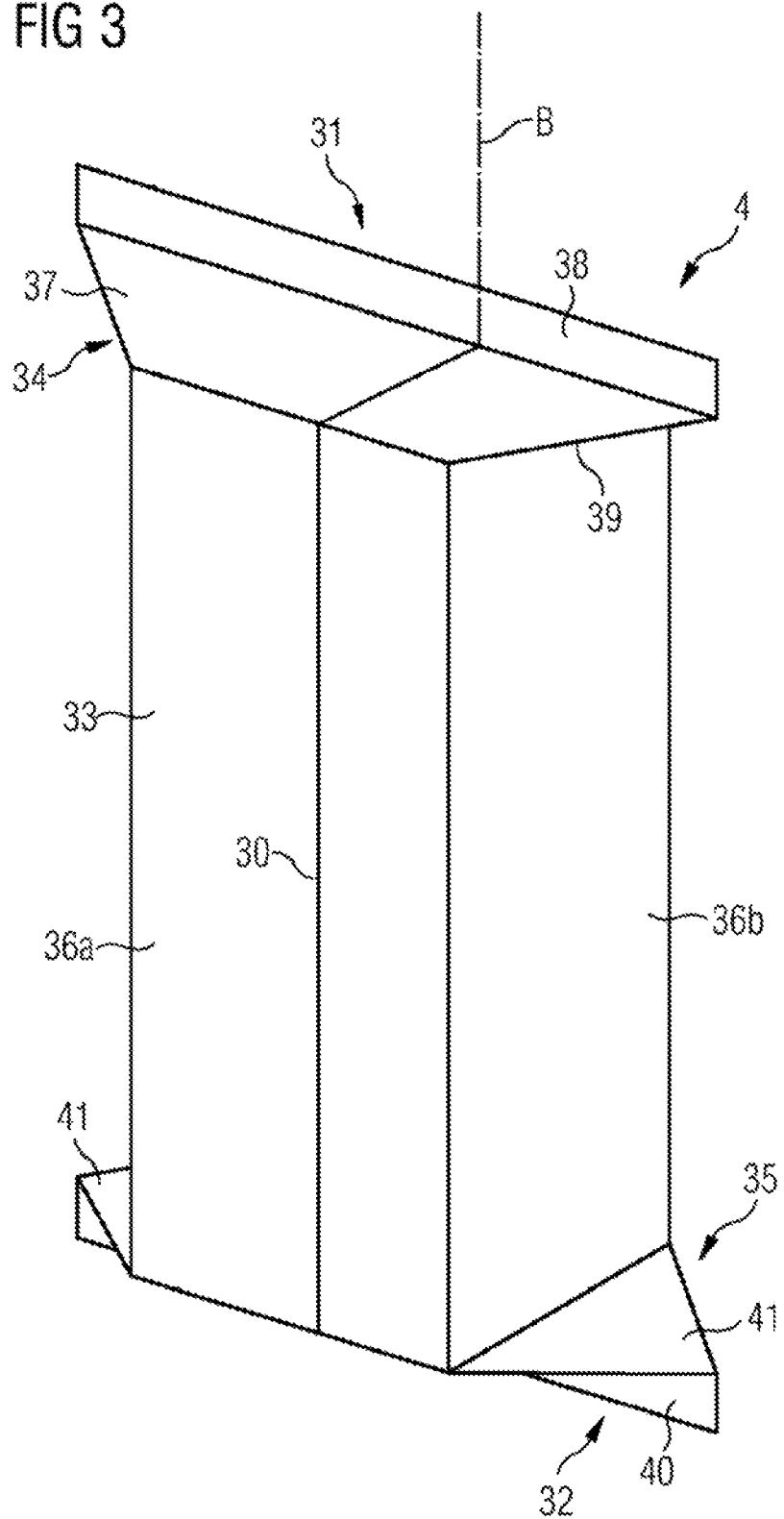

FEEDING UNIT FOR FEEDING SEALED PACKS OF POURABLE FOOD PRODUCTS

TECHNICAL FIELD

The present invention relates to a feeding unit for feeding sealed pillow-shaped packs of pourable food products to a folding unit that forms folded packages from the packs.

BACKGROUND OF INVENTION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated sheet packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The packaging machines comprise a forming unit, wherein the tube is filled continuously downwards with the sterilized or sterile-processed food product, and is sealed and then cut along equally spaced cross sections to form pillow packs, which are then fed to a folding unit to form the finished, e.g. substantially parallelepiped-shaped packages.

More specifically, the pillow packs substantially comprise a parallelepiped-shaped main portion; and a top end portion and a bottom end portion, opposite to each other and projecting laterally on opposite sides of the main portion and defining respective triangular end flaps to be folded onto the main portion.

A longitudinal sealing strip, formed when sealing the packaging material to form the vertical tube, extends along the pillow packs; and the top end portion and bottom end portion of each pillow pack have respective transverse sealing strips perpendicular to the longitudinal sealing strip and defining respective end flaps projecting from the top and bottom of the pack.

The top end portion and the bottom end portion of each pillow pack taper towards the main portion from the respective end flaps.

Folding units are known, substantially comprising a chain conveyor for feeding pillow packs continuously along a predominantly straight horizontal forming path from a supply station to an output station, and a plurality of folding devices which cooperate cyclically with each pillow pack along the forming path to flatten the respective top end portion and bottom end portion of the pillow pack and so fold the respective end flaps onto the top end portion and bottom end portion.

The folding units comprise heating means arranged for heating the pillow packs and melting the plastic material forming the outer plastic layer of the pillow packs at the top end portion and bottom end portion.

In practice, the pillow packs are usually formed and sealed with their longitudinal axis arranged vertically. The newly formed pillow packs are subsequently cut from the tube and let slide along a curved-profile chute so as to be brought from the vertical position to a substantially horizontal position, in which they are received by a feeding unit, arranged immediately downstream of the chute and which drives the pillow packs to the folding unit.

Once the pillow packs are cut from the tube, they move down to the chute and advance along the chute by gravity.

The feeding unit comprises two guides that extend between an inlet zone, where the packs coming from the chute are received, and an outlet zone, where the packs are delivered to the folding unit. The feeding unit further comprises a conveyor belt and a plurality of carriers projecting from the conveyor belt and arranged to interact with the packs to advance the packs along the guides.

The conveyor belt is wounded around a first wheel and a second wheel, the first wheel and the second wheel having substantially horizontal axes. In this way, the conveyor belt has an upper active branch and a lower return branch, the carriers of the upper active branch passing through a gap defined between the two guides and pushing the packs.

A drawback of the known packaging machines is that the packs coming from the forming unit may be not synchronised with the feeding unit.

In particular, the packs may be "delayed" due to different factors such as: sticking to the sealing device that carries out the transversal sealing or to the cutter that separates the packs form the tube; swinging of the packs during and after the sealing step and the cutting step; friction; bouncing of the packs on the chute.

It may therefore happen that—when a carrier reaches the inlet zone—the corresponding pack has not arrived yet and so such carrier is not able to carry any pack. In this case, the following carrier interacts with two packs, i.e. its "own" pack and the "delayed" pack that was not delivered to the preceding carrier. This may cause a jam in the feeding unit or in the folding unit.

It may also happen that—when a pack reaches the inlet zone—the corresponding carrier interacts with an intermediate portion of the pack, instead of an end portion of the pack. In this way, the carrier may crush the pack and damage it.

The above-mentioned drawbacks are particularly relevant in case of high speed packaging machines in which the speed of the conveyor belt is high and the distance between adjacent carriers is small, which makes extremely critical a lack of synchronization between the packs coming from the forming unit and the conveyor belt.

DISCLOSURE OF INVENTION

An object of the invention is to improve the known packaging machines, in particular the feeding units that receives the packs from the forming unit and transfer the packs to the folding unit.

Another object of the invention is to improve the synchronization of the packs coming from the forming unit with the carriers of the feeding unit.

Another object of the invention is to provide a feeding unit in which the delay with which a pack reaches a corresponding carrier is reduced, or eliminated.

Another object of the invention is to provide a feeding unit that is efficient and reliable even when used in high speed packaging machines.

According to the invention, there is provided a folding unit for producing packages of food product pourable into a tube of packaging material from sealed packs, as claimed in claim 1.

BRIEF DESCRIPTION OF THE DRAWINGS

A preferred, non-limiting embodiment of the invention will be described by way of example with reference to the accompanying drawings, in which:

FIG. 3 is a perspective view of a pack to be transferred by the feeding unit of FIG. 1.

DETAILED DESCRIPTION OF PREFERRED EMBODIMENTS

Figure 1:
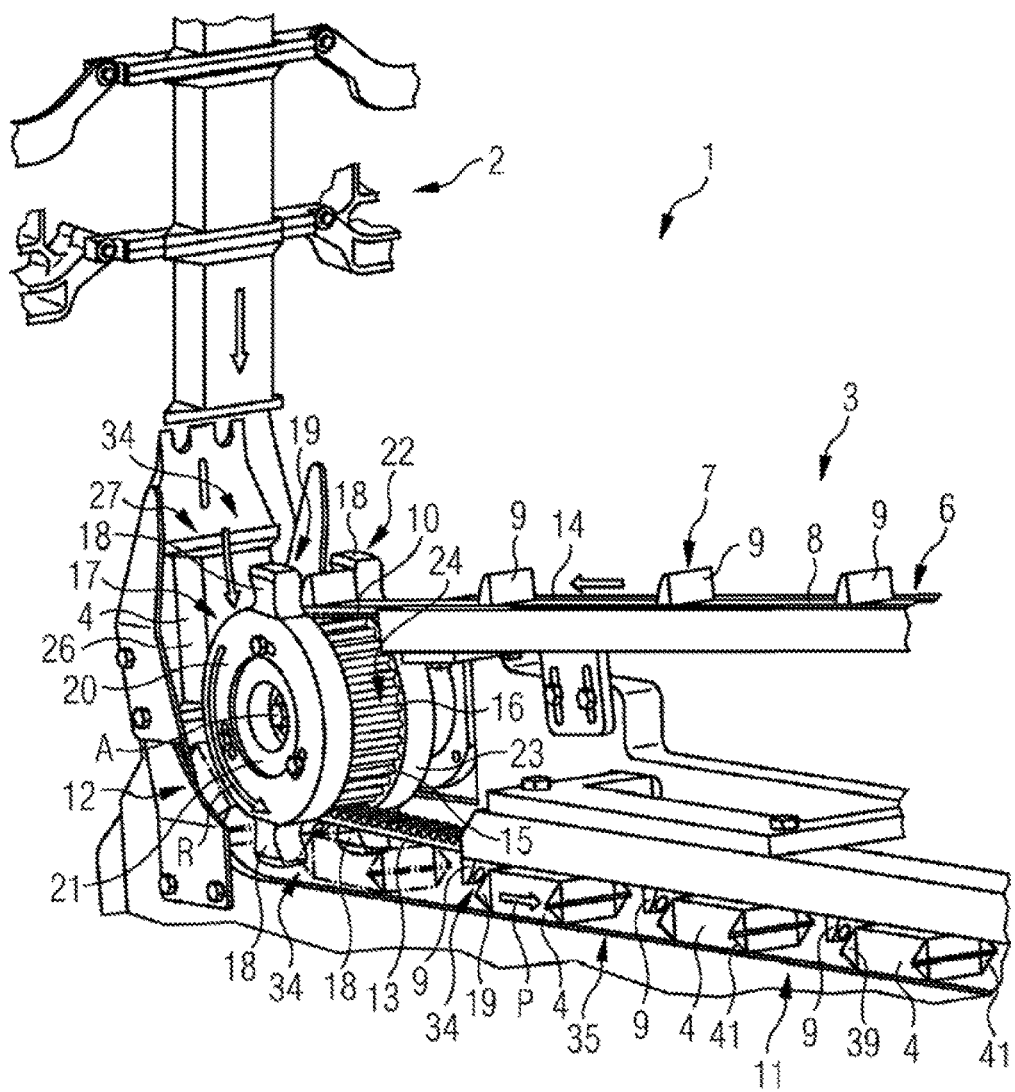
FIG. 1 is a perspective view of a feeding unit according to the invention.
Figure 2:
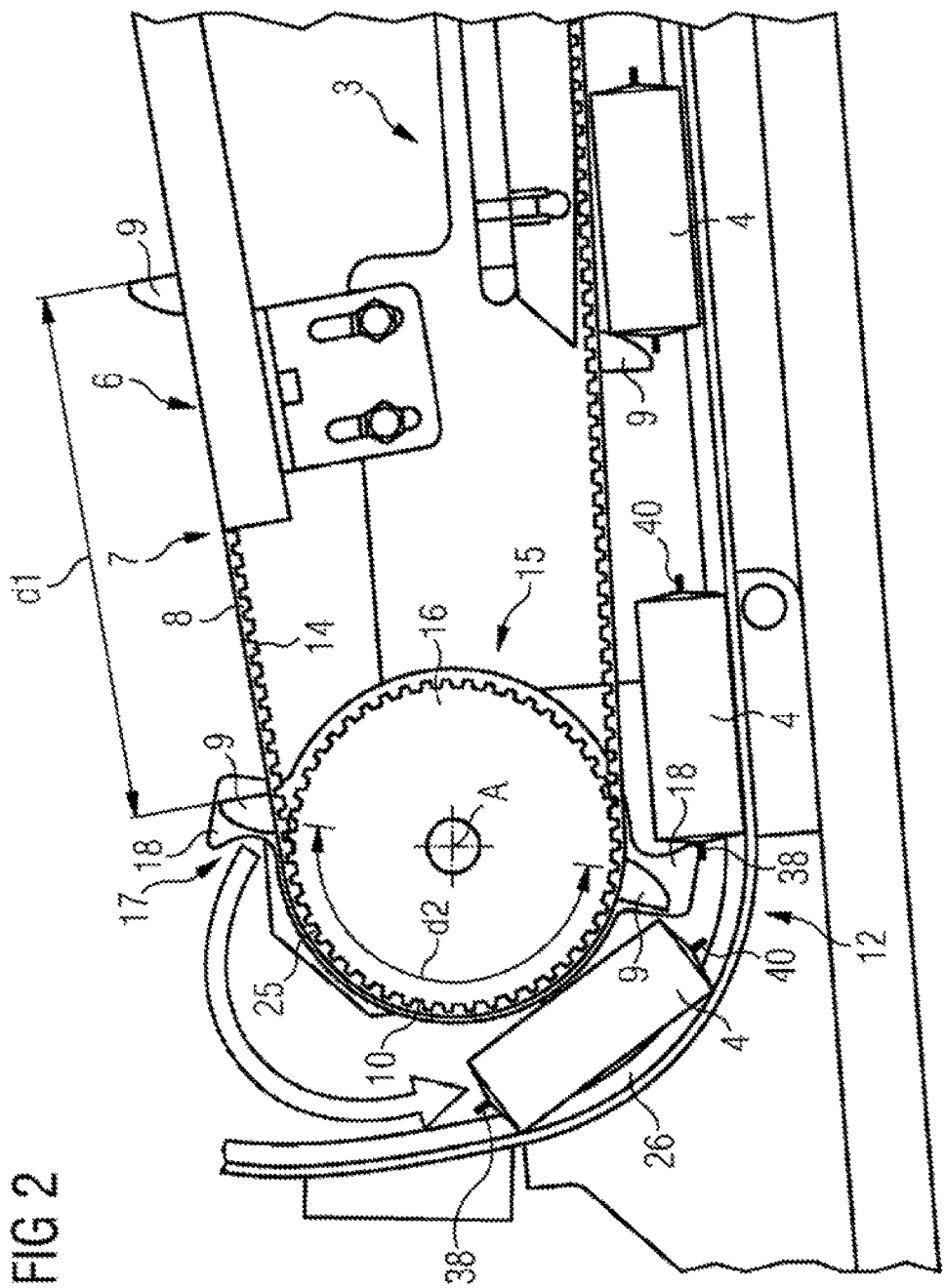
FIG. 2 is a side view of the feeding unit of FIG. 1.

With reference to FIGS. 1 and 2, a packaging machine 1 is shown comprising a forming unit 2, a folding unit (not shown) and a feeding unit 3 interposed between the forming unit 2 and the folding unit.

The forming unit 2 folds, fills and seals a packaging material to obtain pillow-shaped packs 4. In particular, the forming unit 2 continuously produces the packs 4 from a tube of packaging material (not shown).

The tube is formed in known manner by longitudinally folding and sealing a web of heat-seal sheet material which may comprise a base layer for stiffness and strength, which may be formed by a layer of fibrous material, e.g. paper, or of mineral-filled polypropylene material, and a number of layers of heat-seal plastic material, e.g. polyethylene film, covering both sides of the base layer. In the case of an aseptic package for long-storage products, such as UHT milk, the packaging material may also comprises a layer of gas- and light-barrier material, e.g. an aluminium foil or an ethyl vinyl alcohol (EVOH) foil, which is superimposed on a layer of heat-seal plastic material, and is in turn covered with another layer of heat-seal plastic material forming the inner face of the package eventually contacting the food product.

The tube of packaging material is then filled with the food product, and is sealed and cut along equally spaced cross sections to form the packs 4.

With reference to FIG. 3, an embodiment of a pack is shown which has a longitudinal sealing band 30, formed to produce the tube of packaging material from the web folded into a cylinder, extends along one side of the pack 4, which is closed at opposite ends by a first transversal sealing band 31 and a second transversal sealing band 32 perpendicular to and joined to the longitudinal sealing band 30.

Each pack 4 has an axis B, and comprises a main body 33, a first end portion 34 and a second end portion 35 tapering from the main body 33 towards the respective first transverse sealing band 31 and second transverse sealing band 32.

The main body 33 of the pack 4 is bounded laterally by two first lateral walls 36a and two second lateral walls 36b which are alternate to each other.

The first end portion 34 and the second end portion 35 are each defined by two walls 37, each substantially in the form of an isosceles trapezium, which slope slightly towards each other with respect to a plane perpendicular to axis B, and have minor edges defined by opposite edges of respective wall 36a, and major edges joined to each other by the respective first transversal sealing band 31 and second transversal sealing band 32.

The longitudinal sealing band 30 extends between the first transverse sealing band 31 and the second transverse sealing band 32, and along the whole of one wall 36a and the corresponding walls 37 on the same side as the wall 36a.

The first end portion 34 comprises a substantially elongated rectangular first end fin 38, formed by the first transversal sealing band 31, and projecting in the direction of axis B from the pack 4; and two substantially triangular first flaps 39, projecting laterally on opposite sides of the main body 33, and defined by end portions of the walls 37 and by corresponding triangular end portions of the lateral walls 36b.

Similarly, the second end portion 35 comprises a substantially elongated rectangular second end fin 40, formed by the second transversal sealing band 32, and projecting in the direction of axis B from the pack 4; and two substantially triangular second flaps 41, projecting laterally on opposite sides of the main body 33, and defined by end portions of the walls 37 and by corresponding triangular end portions of the lateral walls 36b.

More precisely, each of the first end fin 38 and the second end fin 40 extends along a direction orthogonal to axis B.

To form a package from a pack 4 the folding unit presses the first end portion 34 and the second end portion 35 down flat towards each other, and at the same time folds the first end fin 38 onto the flattened first end portions 34 and the second end fin 40 onto the flattened second end portion 35.

The folding unit folds the second flaps 41 onto top ends of respective walls 36b towards the first end portion 34 and folds the first flaps 39 onto the previously folded first end fin 38, on the opposite side of the second end portion 35.

The feeding unit 3 receives the packs 4 from the forming unit 2 and transfers the packs 4 to the folding unit.

The feeding unit 3 comprises a feeding conveyor 6 having a carrying arrangement 7 movable cyclically along an advancing path P. The carrying arrangement 7 is arranged to carry the packs 4 towards the folding unit.

The carrying arrangement 7 comprises a flexible conveying element 8 and at least one carrying element 9 projecting from the flexible conveying element 8. In particular, as shown in FIGS. 1 and 2, the carrying arrangement 7 comprises a plurality of carrying elements 9.

In the embodiment shown, the flexible conveying element 8 comprises a toothed belt 10.

The feeding conveyor 6 further comprises a guide arrangement 11 which receives the packs 4 and on which the packs 4 slide along the advancing path P.

The feeding conveyor 6 comprises an inlet region 12, at which the packs 4 reach the advancing path P, and an outlet region (not shown), at which the packs 4 leave the advancing path P and are transferred to the folding unit.

The flexible conveying element 8 comprises a lower active branch 13 facing towards the guide arrangement 11 and an upper return branch 14, the upper return branch 14 and the guide arrangement 11 being positioned on opposite sides of the lower active branch 13.

The flexible conveying element 8 is shaped as a loop and is partially wounded on a rotatable body 15 and a further rotatable body (not shown) at least one of which is motorized. The rotatable body 15 and the further rotatable body rotate in a rotation direction R and drive the lower active branch 13 along path P. The rotatable body 15 rotates around an axis A that is substantially horizontal. Similarly, the further rotatable body rotates around a further axis (not shown) that is substantially horizontal.

In the embodiment shown, the rotatable body 15 is a toothed wheel 16 meshing which the toothed belt 10. Similarly, the further rotatable body is a toothed wheel meshing with the toothed belt 10.

The feeding unit 3 further comprises a push arrangement 17 arranged to push the packs 4 towards the advancing path P.

The push arrangement 17 comprises at least one push element 18 and, in particular, a plurality of push elements 18. In the embodiment shown in FIGS. 1 and 2, the push arrangement 17 comprises two push elements 18 arranged at diametrically opposite zones of the rotatable body 15.

The push elements 18 are supported by the rotatable body 15 and rotate integrally with the rotatable body 15.

In particular, the push elements comprises a first group 19 of push elements 18 (two in the embodiment shown) fixed to a first flange 20 firmly connected to a first side 21 of the rotatable body 15 and a second group 22 of push elements 18 (two in the embodiment shown) fixed to a second flange 23 firmly connected to a second side 24 of the rotatable body 15.

The number of push elements 18 of the first group 19 is the same as the number of the push element 18 of the second group 22.

Each push element 18 of the first group 19 is aligned with a corresponding push element 18 of the second group 22. In this way, during operation of the feeding unit 3, a pack 4 interacts at the same time with a push element 18 of the first group 19 and a corresponding push element 18 of the second group 22.

The carrying elements 9 are equally spaced on the flexible conveying element 8 at a first distance d1.

The push elements 18 are equally spaced on the rotatable body 15 at a second distance d2.

The first distance d1 is equal to the second distance d2.

In other words the pitch of the carrying elements 9 on the flexible conveying element 8 is the same as the pitch of the push elements 18 on the rotatable body 15.

In this way, each of the carrying element 9 projecting from a portion 25 of the flexible conveying element 8 that is wound around the rotatable body 15 is aligned with a corresponding push element 18.

The feeding unit 3 further comprises a chute 26 for directing the packs 4 towards the advancing path P. The chute receives the packs 4 with the axis B arranged in a substantially vertical direction and releases the packs 4 with the axis B arranged in a substantially horizontal direction.

The chute 26 is arranged on a side of the rotatable body 15 and defines together with the rotatable body 15 a channel 27, or passage, for the packs 4.

The push elements 18 protrude from the rotatable body 15 so as to extend into the channel 27 and interact with the packs 4.

During operation, a pack 4 is produced by folding the packaging material, forming the tube, filling the tube with a food product and sealing the tube.

A cutting tool cuts the tube and separates the pack 4 from the tube.

Once removed from the tube, the pack 4 reaches the chute 26.

The rotatable body 15 rotates around axis A and two push elements 18 (i.e. a push element 18 fixed to the first flange 20 and a corresponding push element 18 fixed to the second flange 23) interact with the pack 4 to push the pack 4—along the chute 26—towards the advancing path P.

In particular, the two push elements 18 cooperate with the first end portion 34 of the pack 4 and push the pack 4 towards the inlet region 12.

Subsequently, a carrying element 9 interacts with the first end portion 34 of the pack 4 and moves the pack 4 along the advancing path P from the inlet area 12 to the outlet area. The carrying element 9 causes the pack 4 to slide on the guide arrangement 11.

At the outlet area, the pack 4 is delivered to the folding unit.

Owing to the invention it is possible to obtain a feeding unit that allows good synchronization of the packs.

The push elements 18, in fact, interact with the packs 4 as soon as the packs 4 reach the chute 26. The push elements 18 provide a pushing action, or an impulse, on the packs 4 so as to synchronize the packs with the respective carrying elements 9. The push elements 18 assure that the packs 4 are in the right position—at the right time—to be correctly engaged by the carrying elements 9.

In other words, the pushing action, or impulse, compensates for the possible "delay" of the packs.

In the known feeding unit the movement of the packs along the chute is not controlled, since the packs move along the chute (and upstream of the chute) only due to their weight, i.e. by gravity.

On the contrary, in the feeding unit according to the invention the movement of the packs 4 is controlled by the push elements 18 all through the chute 26.

Clearly, changes may be made to the feeding unit 3 as described and illustrated herein without, however, departing from the scope defined in the accompanying claims.

In particular, in the embodiment shown in FIGS. 1 and 2 the push elements 18 are fixed to the same rotatable body 15 that cooperates with the flexible conveying element 8 bearing the carrying elements 9.

In another embodiment, not shown, the push arrangement comprises a driving body that is separate and different from the rotatable body and drives the push elements.

In both cases the push arrangement 17 is distinct from the carrying arrangement 7. In particular, the push elements 18 are distinct from the carrying element 9.

The invention claimed is:

1. A feeding unit for feeding sealed packs of pourable food products to a folding unit arranged to form folded packages from said packs, said feeding unit comprising:
   a feeding conveyor having a carrying arrangement movable cyclically along an advancing path to carry said packs towards said folding unit;
   a push arrangement arranged to push said packs towards said advancing path, said push arrangement pushing said packs to said carrying arrangement of said feeding conveyor; and
   a chute element providing a curved conveyance path for said packs upstream of said feeding conveyor, said push arrangement pushing said packs towards said feeding conveyor while said packs are within said chute element.

2. A feeding unit according to claim 1, wherein said push arrangement comprises a driving body and at least one push element driven by said driving body.

3. A feeding unit according to claim 2, wherein said push arrangement comprises a plurality of push elements and said driving body comprises a rotatable body, said push elements protruding from said rotatable body and being rotated by said rotatable body.

4. A feeding unit according to claim 1, wherein said feeding conveyor comprises a flexible conveying element and said carrying arrangement comprises at least one carrying element moved along said advancing path by said flexible conveying element.

5. A feeding unit according to claim 4, wherein said carrying arrangement comprises a plurality of carrying elements protruding from said flexible conveying element.

6. A feeding unit according to claim 4, wherein said push arrangement comprises a driving body and at least a push element driven by said driving body, and
wherein said flexible conveying element is actuated by said driving body.

7. A feeding unit according to claim 6, wherein
said push arrangement comprises a plurality of push elements and said driving body comprises a rotatable body, said push elements protruding from said rotatable body and being rotated by said rotatable body, and
wherein said flexible conveying element is actuated by said rotatable body.

8. A feeding unit according to claim 7, wherein said carrying elements are equally spaced on said flexible conveying element at a first distance and said push elements are equally spaced on said rotatable body at a second distance, said first distance being equal to said second distance.

9. A feeding unit according to claim 8, wherein said flexible carrying element has the shape of a loop and is partially wound on said rotatable body, the carrying elements protruding from a portion of said flexible carrying element that is wound on said rotatable body being aligned with corresponding push elements protruding from said rotatable body.

10. A feeding unit according to claim 1, wherein said push arrangement comprises a driving body and at least a push element driven by said driving body, and
wherein said chute is arranged on a side of said driving body, said chute and said driving body defining a channel for the packs and said at least one push element extending into said channel to interact with said packs.

11. A feeding unit according to claim 1, wherein said feeding conveyor comprises a guide arrangement for receiving said packs and guiding said packs along said advancing path, said carrying arrangement being positioned above said guide arrangement along said advancing path.

12. A feeding unit for feeding sealed packs of pourable food products to a folding unit, said feeding unit comprising:
a feeding conveyor having a carrying arrangement movable cyclically along an advancing path to carry said packs towards said folding unit;
a push arrangement arranged to push said packs towards said advancing path;
said feeding conveyor comprising a flexible conveying element and said carrying arrangement comprising at least one carrying element moved along said advancing path by said flexible conveying element;
said push arrangement comprising a driving body and at least one push element driven by said driving body; and
said flexible conveying element being actuated by said driving body.

13. A system comprising:
a forming unit configured to fill and seal a packaging material into a sealed pack of pourable food products;
a final folding unit configured to form finished packages of the pourable food products; and
a feeding unit positioned to receive the sealed pack output from the forming unit and to transfer the sealed pack to the final folding unit for final folding, the feeding unit comprising:
a feeding conveyor having a carrying arrangement movable cyclically along an advancing path to carry the sealed pack towards the folding unit, and
a push arrangement comprising at least one push element to push the sealed pack to the carrying arrangement of the feeding conveyor before the sealed pack reaches the carrying arrangement of the feeding conveyor.

14. The system according to claim 13, further comprising:
a rotatable driving body that rotates to simultaneously drive both the feeding conveyor and the at least one push element of the push arrangement.

15. The system according to claim 13, further comprising:
a chute element positioned downstream of the output of the forming unit and upstream of the feeding conveyor, the chute element being a curved conveyance path to transfer the sealed pack from the forming unit to the feeding conveyor, and
the at least one push element of the push arrangement pushing the sealed pack towards the feeding conveyor while the sealed pack is within the chute element.

* * * * *